United States Patent
Bretschneider et al.

(10) Patent No.: US 10,513,034 B2
(45) Date of Patent: Dec. 24, 2019

(54) TRAJECTORY DETERMINATION METHOD FOR NON-PRODUCTIVE MOVEMENTS

(71) Applicant: SIEMENS AKTIENGESELLSCHAFT, München (DE)

(72) Inventors: Jochen Bretschneider, Esslingen (DE); Hartmut Linke, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 5 days.

(21) Appl. No.: 15/742,817

(22) PCT Filed: Jun. 9, 2016

(86) PCT No.: PCT/EP2016/063177
§ 371 (c)(1),
(2) Date: Jan. 8, 2018

(87) PCT Pub. No.: WO2017/005453
PCT Pub. Date: Jan. 12, 2017

(65) Prior Publication Data
US 2018/0207799 A1 Jul. 26, 2018

(30) Foreign Application Priority Data
Jul. 9, 2015 (EP) ..................................... 15176105

(51) Int. Cl.
*B25J 9/16* (2006.01)
*G05B 19/4061* (2006.01)

(52) U.S. Cl.
CPC ........ *B25J 9/1666* (2013.01); *G05B 19/4061* (2013.01); *G05B 2219/39361* (2013.01); *G05B 2219/40476* (2013.01)

(58) Field of Classification Search
None
See application file for complete search history.

(56) References Cited

U.S. PATENT DOCUMENTS 6,411,864 B1 * 6/2002 Fromherz ................ B65H 7/00
700/213
7,570,006 B2 8/2009 Bretschneider
(Continued)

FOREIGN PATENT DOCUMENTS

| CN | 101441736 A | 5/2009 |
| CN | 103009389 A | 3/2013 |

(Continued)

*Primary Examiner* — Jason Lin
(74) *Attorney, Agent, or Firm* — Henry M. Feiereisen LLC

(57) ABSTRACT

A method of controlling a non-productive movement of a tool from a starting position to an end position in a travel envelope of a machine tool includes the steps of a) providing a collision-free first trajectory for the non-productive movement of the tool, b) determining a second trajectory that is improved over the first trajectory with regard to a selectable target parameter using an algorithm, and c) checking the second trajectory for collisions and, if the second trajectory is free of collisions, providing an instruction corresponding to the second trajectory. The first trajectory in step a) includes plural rectilinear segments and the second trajectory in step b) includes a polynomial segment and, if the second trajectory is not free of collisions in step c), steps b) to c) are repeated so that the algorithm is provided with a modified model of the travel envelope in a repeat of step b).

18 Claims, 3 Drawing Sheets

(56) References Cited

U.S. PATENT DOCUMENTS

| | | | |
|---|---|---|---|
| 7,988,606 B2 | 8/2011 | Bretschneider et al. | |
| 8,322,698 B2 | 12/2012 | Bretschneider et al. | |
| 8,700,307 B1* | 4/2014 | Zhao | B25J 9/1666 701/301 |
| 2005/0125155 A1* | 6/2005 | Kudo | B62D 6/002 701/301 |
| 2009/0102410 A1 | 4/2009 | Bretschneider | |
| 2009/0164038 A1 | 6/2009 | Bretschneider et al. | |
| 2009/0222306 A1 | 9/2009 | Bretschneider et al. | |
| 2010/0138018 A1 | 6/2010 | Bretschneider et al. | |
| 2011/0316335 A1 | 12/2011 | Bretschneider et al. | |
| 2013/0184860 A1* | 7/2013 | Ota | B25J 9/1669 700/245 |
| 2014/0257558 A1* | 9/2014 | Frische | B25J 9/1664 700/245 |
| 2015/0094848 A1 | 4/2015 | Bretschneider et al. | |
| 2015/0261201 A1 | 9/2015 | Bretschneider | |
| 2015/0309501 A1* | 10/2015 | Ikegaya | G05B 19/4061 700/186 |
| 2015/0355622 A1 | 12/2015 | Bretschneider et al. | |
| 2016/0124397 A1 | 5/2016 | Bretschneider et al. | |

FOREIGN PATENT DOCUMENTS

| | | |
|---|---|---|
| DE | 10343611 A1 | 4/2005 |
| DE | 102015000291 A1 | 7/2015 |
| TW | 1339147 B | 3/2011 |

* cited by examiner

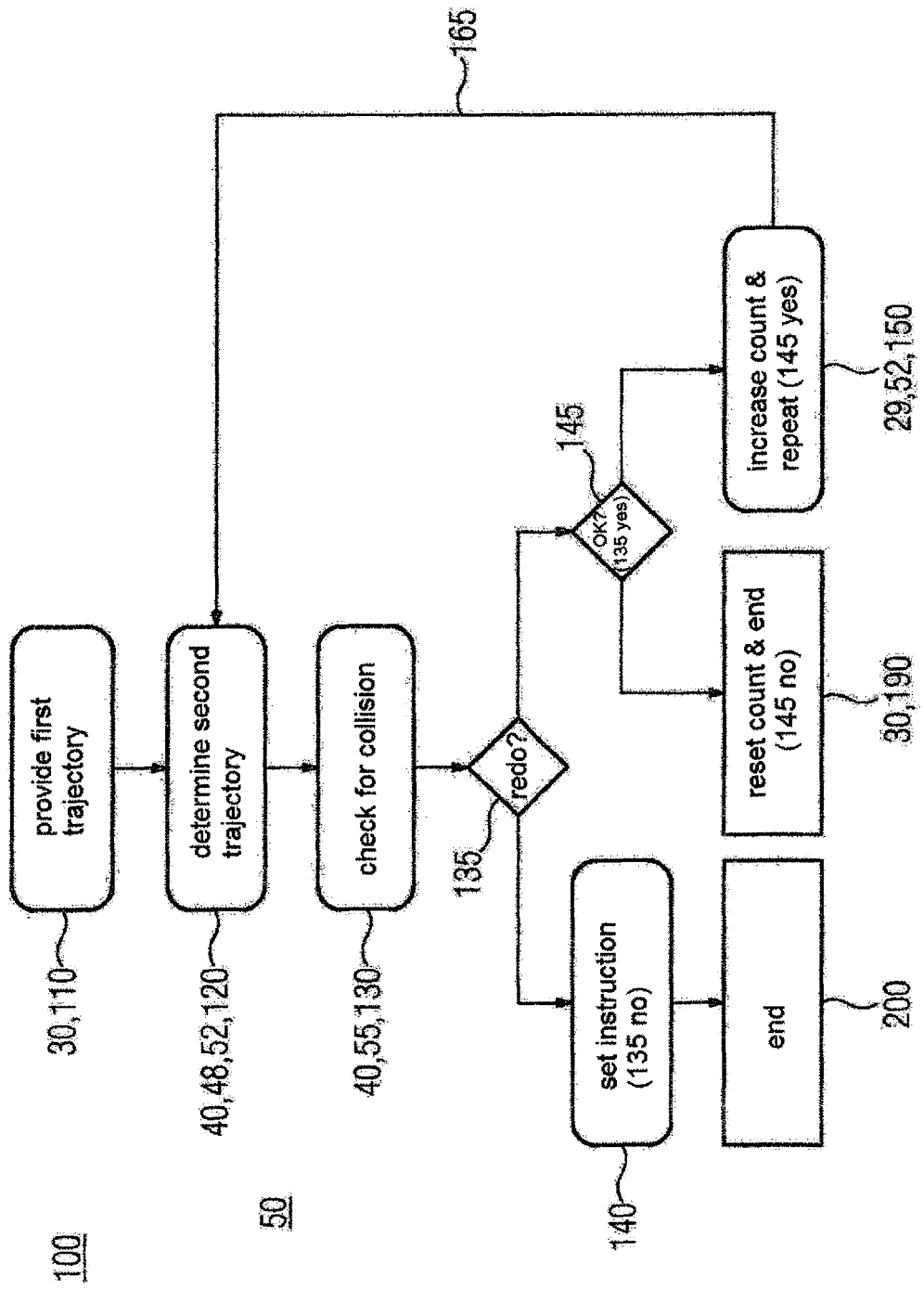

TRAJECTORY DETERMINATION METHOD FOR NON-PRODUCTIVE MOVEMENTS

CROSS-REFERENCES TO RELATED APPLICATIONS

This application is the U.S. National Stage of International Application No. PCT/EP2016/063177, filed Jun. 9, 2016, which designated the United States and has been published as International Publication No. WO 2017/005453 and which claims the priority of European Patent Application, Serial No. 15176105.3, filed Jul. 9, 2015, pursuant to 35 U.S.C. 119(a)-(d).

BACKGROUND OF THE INVENTION

The invention relates to a method for determining a trajectory for a non-productive movement of a machine tool as well as to a program suitable therefor and to an associated control unit for the machine tool.

DE 103 43 611 A1 discloses a method for machine control in which a working envelope is divided into discrete elements. A binary collision parameter for a tool is provided for each discrete element. When a tool passes through a discrete element during a movement, a collision risk is identified by reference to a lookup table. The tool itself is furthermore also depicted by a discretized model.

One disadvantage of known machine control methods is that they are based on an extensive data record of the tool's surroundings, the provision and processing of which during machine operation requires considerable computing power. The prior art methods furthermore require the path for the desired movement to be provided in its entirety by an algorithm which approximates a merely apparent optimum by frequent iteration. This also increases demand for computing power in the known methods.

SUMMARY OF THE INVENTION

The object of the invention is that of providing a possible way of determining a trajectory of a non-productive movement which overcomes the disadvantages of the prior art. A method and means for carrying it out must also be provided which reliably enable an optimized non-productive movement to be performed using little computing power.

The stated object is achieved by the method according to the invention. In the method according to the invention, the non-productive movement of a tool proceeds from a starting position to an end position, both of which are user selectable or are specified by a CAM system. The method firstly provides a collision-free first trajectory for the non-productive movement. The collision-free first trajectory includes no optimization for a further parameter, such as for example a minimum time requirement or minimum energy requirement of the non-productive movement. In a further method step, an algorithm establishes a second trajectory which is improved over the first trajectory with regard to a selectable target parameter. The algorithm here makes use of the starting position, the target position and the existing first trajectory as inputs for establishing the second trajectory. The second trajectory is substantially a modification of the first trajectory.

A subsequent method step involves checking the second trajectory for absence of collisions. If the second trajectory is free of collisions, at least one instruction which corresponds to the second trajectory is established. The at least one instruction can be stored in a control unit of the machine tool and be relayed to tool drive means. The at least one instruction is suitable for causing the tool to follow the second trajectory. According to the invention, the second trajectory comprises at least one polynomial segment. The polynomial segment has a shape which is mathematically describable by a polynomial.

The method according to the invention allows an optimized second trajectory and a corresponding instruction set for an optimized non-productive movement to be established in reliable manner. The claimed method makes use of the starting position and the end position of the non-productive movement which are known in any event. The first trajectory likewise serves as an input for the algorithm and may for example be manually specified by a user. The first trajectory does not require optimization with regard to a target parameter and may accordingly be quickly established. Alternatively, a simple pathfinding method may be used which is designed always to seek an identical distance transversely of the direction of movement from the boundaries of the travel envelope. Overall, the algorithm in the method according to the invention is suitable for establishing an optimized second trajectory from a very largely imprecise, specified first trajectory. As a result, a non-productive movement is performed for example with a minimum time requirement. The method according to the invention places low requirements on the necessary computing power and can be performed on correspondingly simple hardware. The method according to the invention may likewise also be implemented in the context of a modification to an existing machine tool with little computing power. The low computing power requirements furthermore allow the method according to the invention to be executed in real time.

In a preferred embodiment of the invention, the first trajectory comprises a plurality of rectilinear segments. Assembled rectilinear segments which lead to a collision-free trajectory can be rapidly identified and established. Rectilinear segments can furthermore also be provided in memory-saving manner by a small number of machine tool control unit instructions.

In the method according to the invention, the above-described method steps can be repeated if, when checking the second trajectory, a collision is identified, i.e. the trajectory is not free of collisions. In the event of a rerun of the method step in which the improved second trajectory is established with regard to the at least one selectable target parameter, the algorithm is provided with a modified model of the travel envelope. The model of the travel envelope comprises the points and surfaces of the workpiece, workholder, tool table and walls of the machine tool which enclose and/or define the travel envelope reachable by the tool. The model also comprises purely geometric elements such as control planes and target corridors which have no physical counterpart. The model of the travel envelope is here modified by reducing the size of the reachable travel envelope.

In the method according to the invention, an iteration counter can be incremented by one each time that a second trajectory is established by means of the algorithm. The iteration counter records the number of runs of the algorithm calls and is a measure of the time which has elapsed during the functional sequence of the method according to the invention. The iteration counter takes the form of a variable in a program for operating a control unit of the machine tool. When the iteration counter exceeds a threshold value, it is identified that a maximum acceptable time for the method according to the invention has elapsed without a desired collision-free optimized second trajectory having yet successfully been established. In this case, at least one instruction which corresponds to the first trajectory is established and output to the machine tool. This makes it possible to ensure that the method according to the invention does not permanently remain in an endless loop if, for the current task for the algorithm, a desired optimized second trajectory does not exist in the available travel envelope. A control unit program which is in an endless loop typically no longer accepts any further user input. This can conventionally only be overcome by resetting the system. In an ongoing production process, such a reset brings the production process to a temporary standstill.

Equally, the iteration counter stops the algorithm from solving a task which requires excessive computing power. It is not straightforwardly possible to predict in advance the extent to which a task is efficiently solvable, only inefficiently solvable or entirely unsolvable by the algorithm. The method according to the invention thus ensures reliable machine tool operation which can robustly withstand unforeseen complications. There is accordingly no need for a laborious provisional estimate of task complexity. Overall, the method according to the invention makes it possible to avoid downtime in a production process and to boost the economic viability of the machine tool. The threshold value is furthermore adjustable. In the case of a control unit with elevated computing power, it is acceptable to run the method according to the invention more frequently, such that more complex tasks can also be solved by the algorithm.

In a further preferred embodiment of the invention, a tool collision is identified when a point of the second trajectory is located within an obstacle contour. The tool here also includes the toolholder and associated machine elements of the machine tool. The obstacle contour comprises surfaces of obstacles in the region of the workpiece which define a region inaccessible to the tool.

The second trajectory may furthermore be established taking account of a modification of a target corridor in, a selectable control plane. The control plane is substantially a station which must be traversed during the non-productive movement and be passed in the target corridor. The target corridor is a three- or two-dimensional portion in the control plane. The course of the second trajectory should be selected by the algorithm in such a manner that all the target corridors are passed through. In the event of a rerun of the method according to the invention, at least one target corridor may be modified by changing at least one parameter which defines the target corridor. This is for example the position of a corridor end point. The target corridor can consequently be changed in size and position. The requirement that the second trajectory has to pass through the target corridors means that, in the event of the method being rerun, the location of the second trajectory is changed. As a consequence, a collision present in the preceding run can be cleared in the later run. The target corridor is here modified as a function of the position of the present collision. The target corridor may furthermore take the form of a single contiguous surface or of a plurality of separate surfaces.

The algorithm can preferably furthermore take account of at least one dynamic property of the machine tool during establishment of the second trajectory. Such a dynamic property to be taken into account may be a maximum acceleration, a maximum jerk, a maximum angular acceleration or angular velocity at a joint. A corresponding dynamic property may furthermore also be a velocity range which is to be avoided along a tool movement axis in order to reduce vibration stresses on the machine tool. The method according to the invention is thus simply adaptable to the proper operating parameters of a machine tool, as a result of which excessive wear of the machine tool is, for example, avoided.

In a further preferred embodiment of the invention, the at least one instruction which corresponds to the second trajectory is of type G0 or G1. In the G code system typical of NC machines, a G0 instruction initiates a rapid traverse of the tool. G0 instructions can be straightforwardly interpreted and executed by today's machine tools. The method according to the invention thus provides for the optimized second trajectory at least one instruction in a machine-native format which requires no further conversion or emulation. The computing power required for the method according to the invention is further reduced as a consequence.

The method according to the invention can furthermore store the first trajectory in the form of at least one instruction of type G0 in the control unit of the machine tool. Type G0 or G1 instructions allow a user in a simple and logical manner to generate a first trajectory in which the starting position and the end position can simply be automatically identified by the algorithm. G0 instructions moreover allow a user quickly and clearly to generate a first collision-free trajectory. Handling of the method according to the invention is consequently simplified.

In one particularly preferred embodiment of the invention, the at least one selectable target parameter during establishment of the optimized second trajectory is a time requirement of the non-productive movement, the energy requirement necessary therefor, the power loss which occurs, or wear of the tool or of a drive means of the machine tool. Alternatively, a weighted combination of a plurality of individual target parameters may be used as the optimization specification. The method according to the invention may in this manner be adapted to a plurality of requirements or combinations of requirements. The claimed method is flexible overall and has a broad range of application.

The invention furthermore relates to a program which can be stored and executed with a processor. The claimed program is configured to implement at least one of the above-described methods in a control unit of a machine tool. The program according to the invention is platform-independent and can be played on a plurality of control units for machine tools. The program according to the invention requires only little computing power and is thus suitable for modifying an existing machine tool. The low computing power requirement means that the claimed program can be executed substantially in real time on powerful control units.

The invention furthermore relates to a control unit for a machine tool which comprises a storage device and a processor. The latter are configured to store and execute the above-described program. The control unit according to the invention is constructed to be compatible with a plurality of existing machine tools and is particularly suitable for modification or retrofit purposes.

BRIEF DESCRIPTION OF THE DRAWING

The invention is described below in greater detail on the basis of individual embodiments in various figures in which:

FIG. 3 shows a sequence diagram of a third embodiment of the method according to the invention.

DETAILED DESCRIPTION OF PREFERRED EMBODIMENTS

Figure 1:
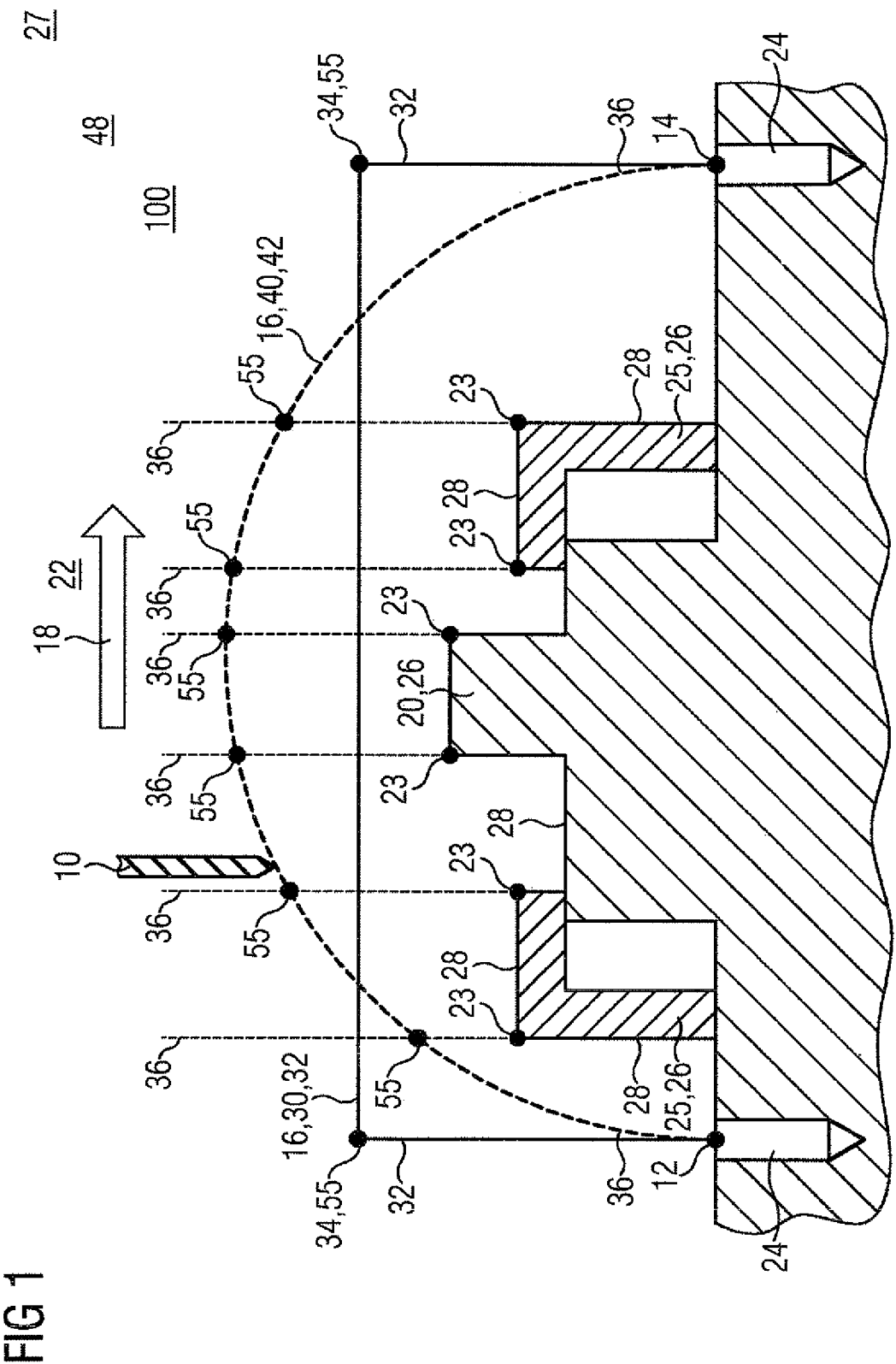
FIG. 1 is a diagrammatic representation of a functional sequence of the method according to the invention in a first embodiment.

FIG. 1 shows a travel envelope 22 in which a tool 10 performs a non-productive movement 16 on the basis of the method 100 according to the invention. The embodiment shown serves to perform a non-productive movement of a tool 10 in a machine tool 50. FIG. 1 shows overall a two-dimensional projection of a three-dimensional movement in the travel envelope 22. In addition to the tool 10, there are also a workpiece 20 and workholder 25, which are each obstacles 26 for the tool 10, arranged in the travel envelope 22. The further fastening of the workholder 25 is not shown in greater detail in FIG. 1. The individual obstacles 26 each have a plurality of outer surfaces which together form a contiguous obstacle contour 28 in the region of the workpiece 20. The workpiece 20, the workholder 25 and recess 24 have edges 23 on their surfaces which are of relevance to the obstacle contour 28 to be taken into account. Information regarding the location of the workpiece 20, workholder 25, obstacle contour 28 and edges 23 are part of a model 27 of the travel envelope 22, on which model the algorithm 48 not shown in greater detail in FIG. 1 is based.

FIG. 1 shows a first trajectory 30 of the non-productive movement 16, which extends from a starting position 12 to a target position 14. The starting position 12 and target position 14 are in each case in the region of a recess 24. The first trajectory 30 substantially consists of rectilinear segments 32 joined together at transition points 34. Rapid changes in direction of the tool 10, which are associated with elevated wear, occur at the transition points 34. Overall, the first trajectory 30 is performed along the same main direction of movement 18 as the second trajectory 40.

The second trajectory 40 comprises a polynomial segment 42 which has a substantially continuous shape, i.e. has no angles. The second trajectory 40 is established by the algorithm 48 on the basis of the first trajectory 30, the specified starting position 12 and the end position 14. The claimed method 100 furthermore checks for absence of collisions at all points of the second trajectory 40. Furthermore, the location of the second trajectory 40 is optimized in the region of the points 55, which are each located in the control planes 36. The control planes 36 are located substantially perpendicular to the main direction of movement 18 of the non-productive movement 16 and in each case extend from an edge 23 of the obstacles 26 outward from the obstacle contour 28 into the travel envelope 22. Furthermore, in the region of the starting position 12, i.e. the recess 24, the second trajectory 40 extends substantially tangentially to the first trajectory 30. In the same way, in the region of the end position 14, where there is likewise a recess 24, the second trajectory 40 extends substantially tangentially to the first trajectory 30. Overall, the non-productive movement 16 guides the tool 10 quickly and without collisions from the starting position 12 to the end position 14 with a minimum of acceleration forces which act transversely of the polynomial segment 42. In addition to the time saving in comparison with the first trajectory 30, wear of the bearings and drives of the tool 10 are reduced thanks to the rapid changes of direction at the transition points 34 of the first trajectory 30 being avoided.

Figure 2:
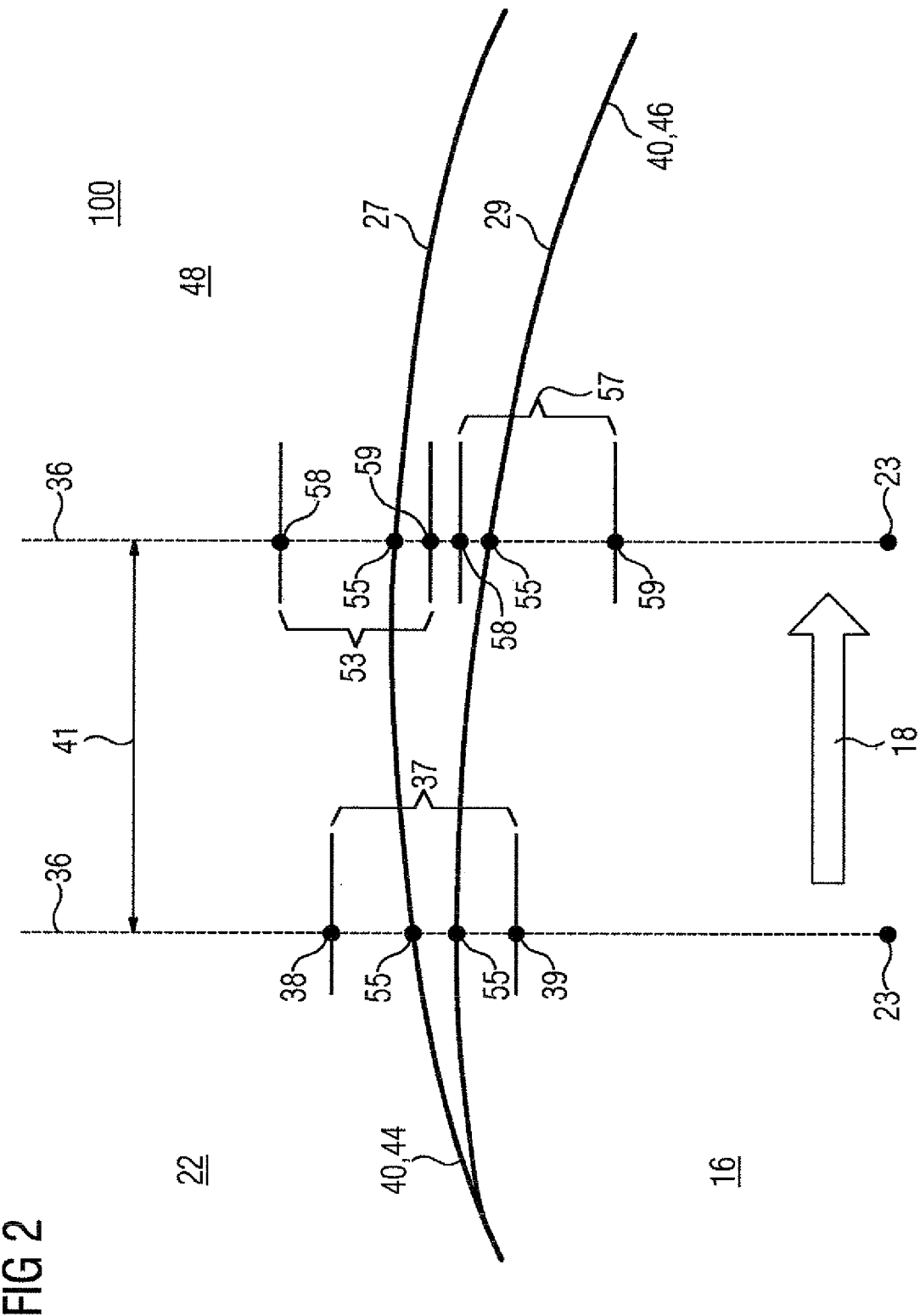
FIG. 2 is a diagrammatic representation of a portion of a functional sequence of the method according to the invention in a second embodiment.

FIG. 2 shows a portion of a second embodiment of the method 100 according to the invention in which the algorithm 48, which is not shown in greater detail, is called in a plurality of runs 44, 46. The embodiment shown serves to perform a non-productive movement of a tool 10 in a machine tool 50. The method 100 is performed in a travel envelope 22 in which obstacles 26, which are not shown in greater detail, with an obstacle contour 28 and edges 23 are arranged. The travel envelope 22 here takes substantially the same form as the travel envelope 22 in FIG. 1. In the first run 44, the algorithm 48 establishes a second trajectory 40 which is based on a model 27 of the travel envelope 22 with control planes 36 with target corridors 37, 53.

The method 100 in FIG. 2 is a two-dimensional projection of a three-dimensional movement. The control planes 36 each end at an edge 23 which is part of an obstacle 26 in the travel envelope 22. A first target corridor 37, which is defined by first and second corridor end points 38, 39, is located in a control plane 36. The distance between the corridor end points 38, 39 here determines the size of the first target corridor 37. A point 55 on the second trajectory 40 from the first run 44 is located in the associated control plane 36 outside the first target corridor 37, such that there is an absence of collisions at the corresponding point. Further along the main direction of movement 18 of the non-productive movement 16 to be performed, the second trajectory 40 from the first run 44 passes through a further control plane 36 at point 55. A second target corridor 53, the size of which is defined by the distance between the corridor-end points 58, 59, is located in the control plane 36 shown on the right in FIG. 2. The point 55 on the second trajectory 40 from the first run 44 is located in the control plane 36 thereof within the second target corridor 53. A collision in a segment, which is not shown in greater detail, of the travel envelope 22 is established for the second trajectory 40 from the first run 44.

In a subsequent second run 46, a modified model 29 of the travel envelope 22 and its control planes 36 and target corridors 37, 57 is used as the basis for the algorithm 48. The modified second target corridor 57 comprises two corridor end points 58, 59 which are located outside the target corridor 53 which is based on the model 27 of the travel envelope 22 from the first run 44. As a consequence, in the second run 46 a second trajectory 40 is established, the location of which differs from the second trajectory 40 from the first run 44. In the second run 46 as well, point 55 of the second trajectory 40 is located within the first target corridor 37. Furthermore, point 55 of the second trajectory 40 from the second run 46 is located in the associated control plane 36 within the modified second target corridor 57. The first and second target corridors 37, 53 are based on the model 27 which reflects the location of the control planes 36 and the target corridors 37, 53.

FIG. 3 shows a sequence diagram of a third embodiment of the method 100 according to the invention. The embodiment shown serves to perform a non-productive movement of a tool 10 in a machine tool 50. A provision step 110 provides a first trajectory 30 for the non-productive movement 16 to be performed, such as for example in FIG. 1. This proceeds, for example, by a first trajectory 30 input manually by a user for a algorithm 48 being loaded from an electronic storage device. In a subsequent optimization step 120, the provided first trajectory 30 is further processed by means of the algorithm 48 and a second trajectory 40 optimized for at least one target parameter is established. An iteration counter 52 which represents the number of runs of the optimization step 120 is initialized in a first run of the optimization step 120. The second trajectory 40 established in the optimization step 120 leads from the same starting position 12 to the same target position 14 as the first trajectory 30. In a further method step, the collision checking step 130, it is identified whether there is an absence of collisions for the second trajectory 40 over the entire non-productive movement 16 to be performed. The further method sequence branches as a function of the result of the check of method step 130. This is shown in FIG. 2 by the first branch point 135. If all the points 55 on the second trajectory 40 are free of collisions, a finalization step 140 follows. In the finalization step 140, the second trajectory 40 is defined as no longer modifiable and at least one instruction for controlling the tool 10 of the machine tool 50 is established on the basis of the second trajectory 40. According to the invention, the second trajectory 40 here comprises at least one polynomial segment. The at least one instruction is suitable for guiding the tool 10 in such a manner that the established second trajectory 40 is followed. To this end, the at least one instruction is directed to a drive means of the tool 10. Once the at least one instruction has been established, the method 200 terminates.

If, in contrast, a collision for at least one point 55 of the second trajectory 40 is established in the collision checking step 130, it is checked whether the iteration counter 52 has exceeded a threshold value. The method sequence branches further as a function of the result of the check. This branch is shown in FIG. 3 by the second branch point 145. If the iteration counter 52 has already exceeded the threshold value, the reset step 190 follows in which repeated performance of the optimization step 120 is stopped. It is furthermore specified in the reset step 190 that the first trajectory 30 should be used for the non-productive movement 16 to be performed. In this case, the method 100 according to the invention finishes with the reset step 190.

If the iteration counter has not yet exceeded the threshold value at branch point 145, a modification step 150 follows, in which a modified model 29 of the travel envelope 22 and the obstacles 26 located therein is generated. The iteration counter 52 is furthermore incremented by one. In a subsequent feedback step 165, the modified model 29 is provided to the algorithm 48 for a rerun of the optimization step 120. Overall, the method 100 according to the invention implements the principle of a finite state machine in which the occurrence of an endless loop is ruled out. As a consequence, the method according to the invention 100 offers a high level of reliability and avoids downtime of machine tools 50.

What is claimed is:

1. A method of controlling a non-productive movement of a tool from a starting position to an end position in a travel envelope of the tool, said method being executed by a processor, said method comprising the steps of: a) providing a collision-free first trajectory for the non-productive movement of the tool; b) determining a second trajectory that is improved over the first trajectory with regard to a selectable target parameter using an algorithm; c) checking the second trajectory for collisions and, if the second trajectory is free of collisions, providing at least one instruction corresponding to the second trajectory; wherein the first trajectory in step a) comprises a plurality of rectilinear segments and the second trajectory in step b) comprises a polynomial segment and, if the second trajectory is not free of collisions in step c), steps b) to c) are repeated so that the algorithm is provided using a modified model of the travel envelope in a repeat of step b), and wherein an iteration counter is incremented by one for each repeat of step b), and in step c) at least one instruction corresponding to the first trajectory is established if the iteration counter exceeds a threshold value.

2. The method of claim 1, wherein a collision of the tool is identified in step c) if a point in the second trajectory is located within an obstacle contour.

3. The method of claim 1, wherein at least one parameter of at least one target corridor is modified to achieve an absence of collisions in the modified model of the travel envelope.

4. The method of claim 1, wherein the algorithm in step b) takes account of at least one dynamic property of the machine tool.

5. The method of claim 1, wherein the instruction in step c) is an instruction of type G0 or G1.

6. The method of claim 1, wherein that the first trajectory is stored in the form of at least one instruction of type G0 instruction in a control unit of the machine tool.

7. The method claim 1, wherein at least one selectable target parameter is a time requirement, an energy requirement, a power loss parameter, or a parameter of wear of the tool or drive means during the non-productive movement.

8. A machine tool control program fixed in a non-transitory machine-readable medium, said control program being configured to be executed by a machine and to operate a control unit of the machine tool, said program controlling a non-productive movement of a tool from a starting position to an end position in a travel envelope of the tool, said program comprising: a) a routine providing a collision-free first trajectory for the non-productive movement of the tool; b) a routine determining a second trajectory that is improved over the first trajectory with regard to a selectable target parameter using an algorithm; c) a routine checking the second trajectory for collisions and, if the second trajectory is free of collisions, providing at least one instruction corresponding to the second trajectory; wherein the first trajectory of routine a) comprises a plurality of rectilinear segments and the second trajectory of routine b) comprises a polynomial segment and, if the second trajectory is not free of collisions of routine c), routines b) to c) are repeated so that the algorithm is provided by a modified model of the travel envelope in a repeat of routine b); and further comprising a routine that increments an iteration counter by one for each repeat of routine b) and at least one instruction corresponding to the first trajectory is established if the iteration counter exceeds a threshold value in routine c).

9. The program of claim 8, wherein a collision of the tool is identified in routine c) if a point in the second trajectory is located within an obstacle contour.

10. The program of claim 8, wherein at least one parameter of at least one target corridor is modified to achieve an absence of collisions in the modified model of the travel envelope.

11. The program of claim 8, wherein the algorithm of routine b) takes account of at least one dynamic property of the machine tool.

12. The program of claim 8, wherein the instruction provided by routine c) is an instruction of type G0 or G1.

13. The program of claim 8, wherein that the first trajectory is stored in the form of at least one instruction of type G0 instruction in a control unit of the machine tool.

14. The program claim 8, wherein at least one selectable target parameter is a time requirement, an energy requirement, a power loss parameter, or wear of the tool or drive means parameter during the non-productive movement.

15. A machine tool control unit, comprising:
a storage device including a program configured to operate a control unit of the machine tool, said program controlling a non-productive movement of a tool from a starting position to an end position in a travel envelope of the tool, said program comprising:
a) a routine providing a collision-free first trajectory for the non-productive movement of the tool;
b) a routine determining a second trajectory that is improved over the first trajectory with regard to a selectable target parameter using an algorithm;
c) a routine checking the second trajectory for collisions and, if the second trajectory is free of collisions, providing at least one instruction corresponding to the second trajectory;
wherein the first trajectory of routine a) comprises a plurality of rectilinear segments and the second trajectory of routine b) comprises a polynomial segment and, if the second trajectory is not free of collisions of routine c), routines b) to c) are repeated so that the algorithm is provided by a modified model of the travel envelope in a repeat of routine b);

a processor configured to perform the program; and
an iteration counter, wherein a routine increments the iteration counter by one for each repeat of routine b) and wherein at least one instruction corresponding to the first trajectory is established if the iteration counter exceeds a threshold value in routine c).

16. The machine tool control unit of claim 15, wherein a collision of the tool is identified in routine c) if a point in the second trajectory is located within an obstacle contour.

17. The machine tool control unit of claim 15, wherein at least one parameter of at least one target corridor is modified to achieve an absence of collisions in the modified model of the travel envelope.

18. The machine tool control unit of claim 15 wherein the algorithm of routine b) takes account of at least one dynamic property of the machine tool.

\* \* \* \* \*